US011029670B2

(12) United States Patent
Nakazono et al.

(10) Patent No.: US 11,029,670 B2
(45) Date of Patent: *Jun. 8, 2021

(54) MANAGEMENT APPARATUS AND MANAGEMENT METHOD

(71) Applicant: Panasonic Intellectual Property Management Co., Ltd., Osaka (JP)

(72) Inventors: Atsushi Nakazono, Yamanashi (JP); Hisashi Maezono, Yamanashi (JP); Kazunori Tomotake, Yamanashi (JP); Hideo Matsuoka, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 10 days.

This patent is subject to a terminal disclaimer.

(21) Appl. No.: 16/806,313

(22) Filed: Mar. 2, 2020

(65) Prior Publication Data
US 2020/0201302 A1  Jun. 25, 2020

Related U.S. Application Data

(63) Continuation of application No. 14/936,853, filed on Nov. 10, 2015, now Pat. No. 10,620,614.

(30) Foreign Application Priority Data

Dec. 12, 2014 (JP) .............................. JP2014-251639

(51) Int. Cl.
*G05B 19/418* (2006.01)

(52) U.S. Cl.
CPC ........... *G05B 19/41865* (2013.01); *G05B 2219/31376* (2013.01); *G05B 2219/45031* (2013.01); *G05B 2219/50386* (2013.01); *Y02P 90/02* (2015.11)

(58) Field of Classification Search
CPC .... G05B 19/41865; G05B 2219/31376; G05B 2219/45031; G05B 2219/50386; Y02P 90/02
See application file for complete search history.

(56) References Cited

U.S. PATENT DOCUMENTS 6,629,007 B1   9/2003  Hattori et al.
8,224,472 B1   7/2012  Maluf et al.
(Continued)

FOREIGN PATENT DOCUMENTS

CN         1836477 A    9/2006
CN       106233827 A   12/2016
(Continued)

OTHER PUBLICATIONS

English Translation of Chinese Search Report dated Mar. 18, 2019 for the related Chinese Patent Application No. 201510909712.X.

*Primary Examiner* — Thomas C Lee
*Assistant Examiner* — Gary Collins
(74) *Attorney, Agent, or Firm* — Pearne & Gordon LLP

(57) ABSTRACT

A management apparatus manages works to supply components to component mounting devices in a component mounting line. The management apparatus includes a component remaining number information acquisition portion that acquires, from each of the component mounting devices, a remaining number of components stored in the component mounting device, a worker information storage portion that stores worker information including a working range of each of workers in the component mounting line, a work sequence decision portion that generates work sequence information indicating a work sequence of component supply works for each of the workers based on the worker information and component remaining number information about a plurality of components within a predetermined period of time, and an information transmission (Continued)

portion that transmits the work sequence information to the workers who should perform the works.

12 Claims, 8 Drawing Sheets

(56) References Cited

U.S. PATENT DOCUMENTS

| | | |
|---|---|---|
| 2006/0200264 A1 | 9/2006 | Kodama et al. |
| 2007/0288306 A1 | 12/2007 | Ohishi et al. |
| 2013/0103552 A1 | 4/2013 | Hoffman et al. |
| 2013/0138463 A1 | 5/2013 | Amini |
| 2014/0358703 A1 | 12/2014 | Stuntebeck et al. |
| 2016/0109251 A1 | 4/2016 | Thakur |
| 2017/0061365 A1 | 3/2017 | Nonoyama |

FOREIGN PATENT DOCUMENTS

| | | |
|---|---|---|
| JP | 2009-145942 A | 7/2009 |
| JP | 4491418 B2 | 6/2010 |
| JP | 2014-115707 A | 6/2014 |
| WO | 2004/086841 A1 | 10/2004 |
| WO | 2005/009101 A1 | 1/2005 |

(FACILITY 1 TO FACILITY 9)

FIG. 5

| WORK SEQUENCE CREATION PROCESSING RELATED INFORMATION | | | |
|---|---|---|---|
| PROCESSING START TIME ACQUISITION INFORMATION | | COMPONENT REMAINING NUMBER INFORMATION | 11a |
| | | FACILITY EVENT INFORMATION | 11b |
| | | LOG-IN STATE INFORMATION | 22a |
| CONDITIONS | CONDITION 1 | TO PREVENT FACILITY STOP FROM OCCURRING DUE TO SHORTAGE OF COMPONENTS | 35a |
| | CONDITION 2 | TO MAKE MOVING DISTANCE REQUIRED FOR SUPPLYING COMPONENTS AS SMALL AS POSSIBLE | 35b |
| | CONDITION 3 | TO PREFERENTIALLY SUPPLY COMPONENTS SHORTER IN TIME BEFORE THE COMPONENTS ARE USED UP | 35c |
| | CONDITION 4 | TO SATISFY FOLLOWING CONDITIONS WHEN PLURALITY OF OPERATORS ARE ASSIGNED WITHIN ONE AND THE SAME WORKING AREA | 35d |
| | | TO HAVE SHORT COMPONENT SUPPLY WORK TIME | |
| | | TO HAVE LONG WORK ENGAGEMENT TIME | |
| | CONDITION 5 | WHEN ANY OPERATOR IN CHARGE OF WORK HAS NOT LOGGED IN, THE WORK IS ASSIGNED TO ANOTHER OPERATOR (WHEN ALL THE OPERATORS HAVE NOT LOGGED IN, NOTIFICATION IS SENT TO MANAGER | 35e |
| EXCEPTION HANDLING | | WHEN AN INTERRUPT (SUCH AS AN EVENT IN WHICH THE REMAINING NUMBER OF COMPONENTS IS BELOW A THRESHOLD OR AN EVENT IN WHICH THE COMPONENTS IS USED UP) OCCURS AFTER OPTIMIZED CALCULATION IS TERMINATED AND WORK SEQUENCE INFORMATION IS TRANSMITTED, PROCESSING FOR CREATING WORK SEQUENCE IS PERFORMED IN REAL TIME SO THAT THE COMPONENTS CAN BE SUPPLIED WITH PRIORITY | 36 |

33, 34, 35, 36

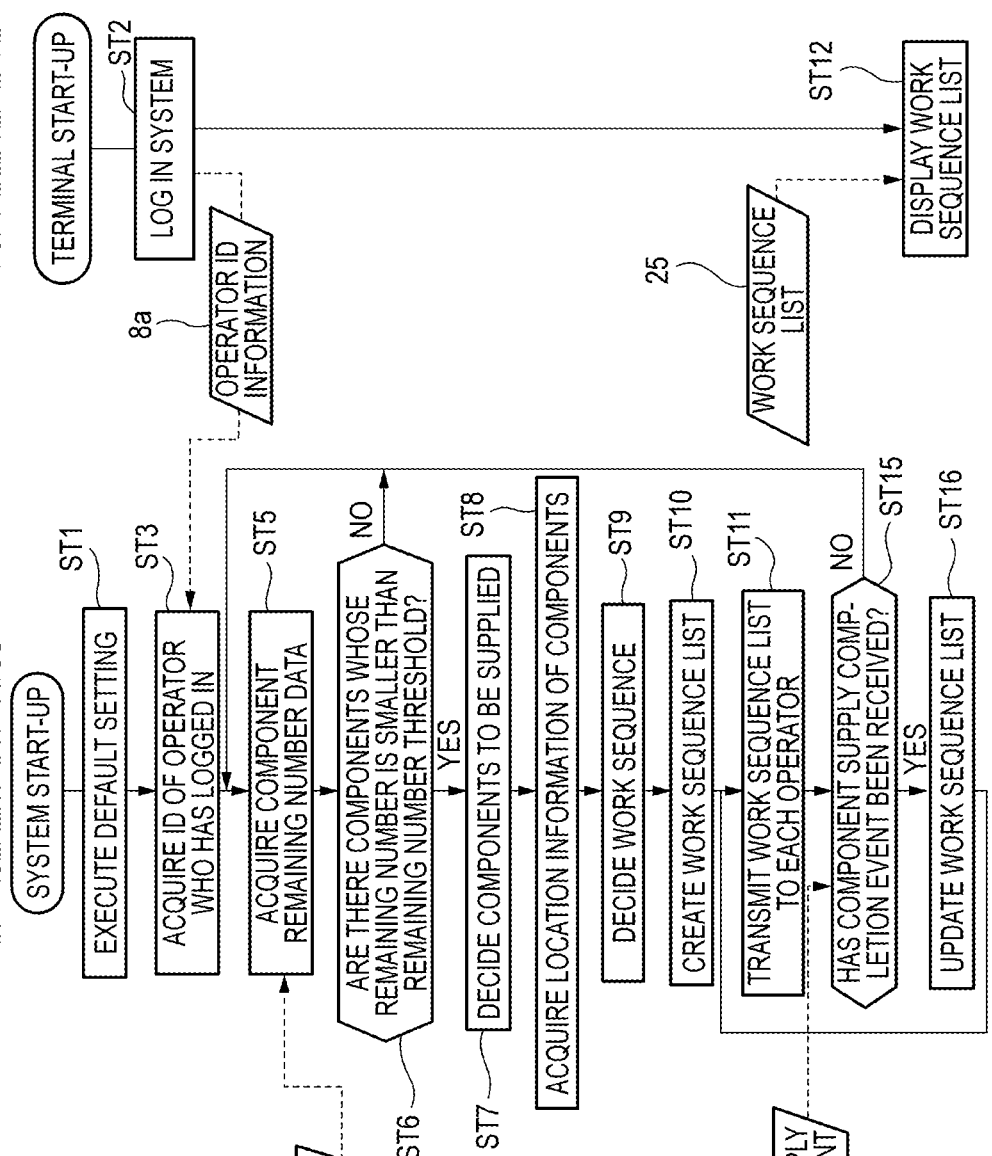

FIG. 7A

| No. | TARGET LINE | TABLE | ADDRESS | COMPO-NENT NAME | LOCATION POSITION |
|---|---|---|---|---|---|
| \multicolumn{3}{l|}{WORK SEQUENCE LIST} | \multicolumn{3}{l|}{OPERATOR A (ID: OP1a)} | |
| 1 | L(1) | T(2) | A(3) | Paaa | COMPONENT SHELF (1) |
| 2 | L(1) | T(5) | A(4) | Pbbb | COMPONENT SHELF (1) |
| 3 | L(1) | T(9) | A(5) | Pccc | COMPONENT SHELF (2) |
| 4 | L(1) | T(8) | A(3) | Pddd | COMPONENT SHELF (2) |

FIG. 7B

| No. | TARGET LINE | TABLE | ADDRESS | COMPO-NENT NAME | LOCATION POSITION |
|---|---|---|---|---|---|
| 1 | L(2) | T(7) | A(8) | Pccc | COMPONENT SHELF (2) |
| 2 | L(2) | T(9) | A(9) | Pddd | COMPONENT SHELF (2) |
| 3 | L(3) | T(5) | A(3) | Peee | COMPONENT SHELF (3) |
| 4 | L(3) | T(3) | A(6) | Pfff | COMPONENT SHELF (3) |

MANAGEMENT APPARATUS AND MANAGEMENT METHOD

CROSS REFERENCE TO RELATED APPLICATION(S)

This application is a continuation of U.S. patent application Ser. No. 14/936,853 filed on Nov. 10, 2015, which claims the priority from Japanese Patent Application No. 2014-251639 filed on Dec. 12, 2014, the entire contents of which are incorporated herein by reference.

BACKGROUND

1. Technical Field

The present invention relates to a management apparatus for managing work for supplying components to component mounting devices, and a management method for managing the work for supplying components to the component mounting devices.

2. Description of the Related Art

A component mounting line for mounting electronic components on substrates is constituted by a plurality of component mounting devices connected to one another, and each component mounting device is mounted with a plurality of component feeding devices such as tape feeders. Generally, a worker who manages the component mounting devices performs work for supplying/replacing components when components stored in any of the component feeding devices are used up in the process where component mounting work is continuously executed. The worker often carries out work with a large number of component mounting devices. Therefore, various measures to reduce a work load have been taken.

For example, as a management apparatus for managing component mounting devices, there has been known a management apparatus provided with a function of giving an instruction to a worker to replace components when the components have been used up or are going to be used up (for example, see JP-B-4491418). In the background art technique disclosed in JP-B-4491418, a working system for substrates is provided with a plurality of working mechanisms for carrying out work on the substrates. Whenever the necessity of support work such as component replacement work occurs in the working system, support work for each working mechanism is assigned to one of a plurality of workers.

However, in JP-B-4491418, each component replacement work is simply assigned to a worker who is suitable for the work. There is a room for improvement in view of increase in efficiency for assignment of a plurality of works to workers. That is, information about shortage of components or the like is not always given timely and surely for a plurality of component mounting lines. As a result, there is a case where facility stop may occur due to the shortage of components.

SUMMARY

It is therefore an object of the invention to provide a management apparatus and a management method capable of suppressing deterioration in operating rate due to facility stop caused by shortage of components.

A management apparatus according to the invention is a management apparatus that manages work to supply components to a plurality of component mounting devices in a component mounting line in which the component mounting devices are connected to one another, the management apparatus including: a component remaining number information acquisition portion that acquires, from each of the component mounting devices, a remaining number of components stored in the component mounting device; a worker information storage portion that stores worker information including a working range of each of workers in the component mounting line; a work sequence decision portion that generates work sequence information indicating a work sequence of a plurality of component supply works for each of the workers based on the worker information and component remaining number information about a plurality of components acquired by the component remaining number information acquisition portion within a predetermined period of time; and an information transmission portion that transmits the work sequence information to the workers who should perform the works.

A management method according to the invention is a management for managing works to supply components to a plurality of component mounting devices by a management apparatus that manages a component mounting line in which the component mounting devices are connected to one another, the management method including: acquiring, from each of the component mounting devices, a remaining number of components stored in the component mounting device; generates work sequence information indicating a work sequence of a plurality of component supply works for each of the workers based on worker information including a working range of each of workers in the component mounting line and component remaining number information about a plurality of components acquired within a predetermined period of time; and transmitting the work sequence information to the workers who should perform the works.

According to the invention, it is possible to suppress deterioration in operating rate due to facility stop caused by shortage of components.

BRIEF DESCRIPTION OF THE DRAWINGS

FIG. 5 is a table for explaining work sequence creation processing information for component supply works in the component mounting system to which the management apparatus according to the embodiment of the invention is applied.

FIGS. 6A, 6B and 6C are flow charts showing an execution form of the component supply works in the component mounting system according to the embodiment of the invention is applied.

FIGS. 7A and 7B are tables for explaining a work sequence list of the component supply works in the component mounting system according to the embodiment of the invention is applied.

DETAILED DESCRIPTION OF THE EXEMPLARY EMBODIMENTS

Figure 1A:
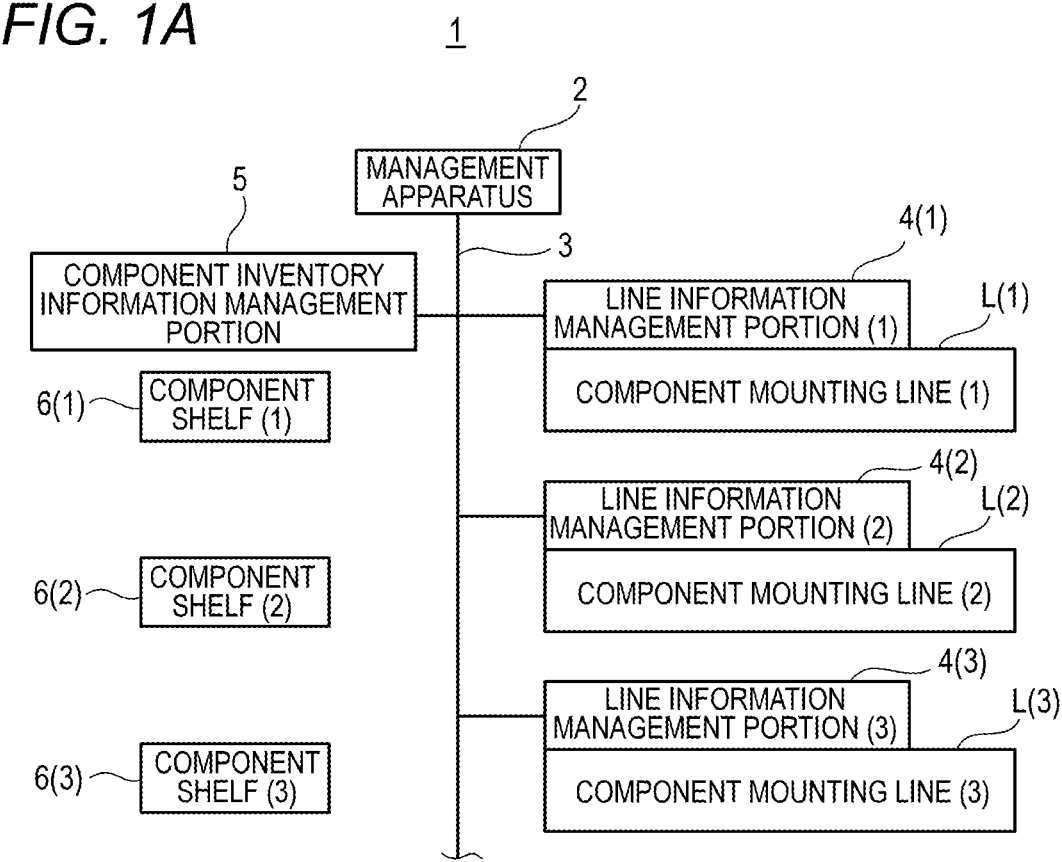
FIGS. 1A and 1B are diagrams for explaining the configuration of a component mounting system to which a management apparatus according to an embodiment of the invention is applied.

Next, an embodiment will be described with reference to the drawings. First, the configuration of a component mounting system 1 to which a management apparatus according to the embodiment is applied will be described with reference to FIGS. 1A and 1B. As illustrated in FIG. 1A, the component mounting system 1 has a plurality of component mounting lines L (only three lines are illustrated here). Each of the component mounting lines L has a line information management portion 4. The line information management portion 4 is connected to a management apparatus 2 through a communication network 3. The management apparatus 2 has a function of managing component supply works (here gives an instruction of a work sequence of component supply works to each worker).

Figure 1B:
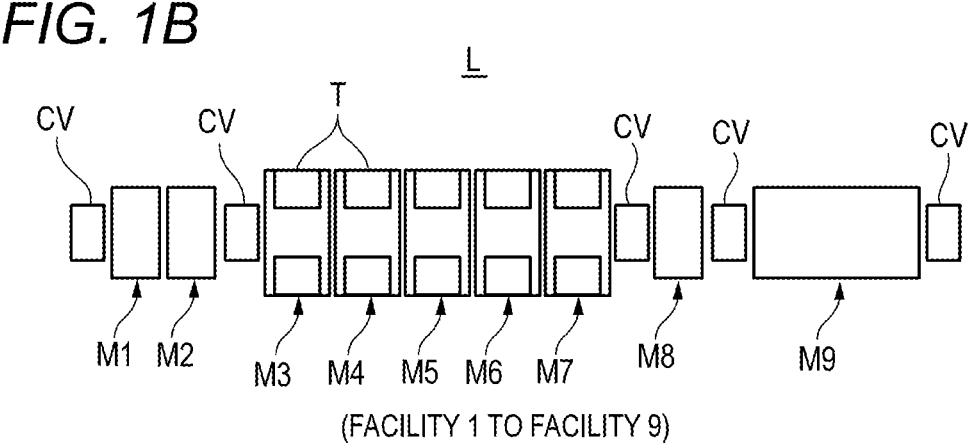

The component mounting line L includes a plurality of facilities for mounting components as illustrated in FIG. 1B. In the example illustrated here, the facilities for mounting components include a printing device M1, a print inspection device M2, a plurality of component mounting devices M3 to M7, a mount inspection device M8 and a reflow device M9. Those facilities (M1 to M9) for mounting components are arranged in series. Conveyor devices CV for conveying and delivering substrates are disposed on the upstream side of the printing device M1, between the print inspection device M2 and the component mounting device M3, between the component mounting device M7 and the mount inspection device M8, between the mounting inspection device M8 and the reflow device M9, and on the downstream side of the reflow device M9, respectively. Various kinds of information (line information) generated in the operating process of each facility in each component mounting line L are collected and managed by the line information management portion 4 belonging to the component mounting line L, and transmitted to the management apparatus 2 through the communication network 3 in accordance with necessity.

Each component mounting device M3 to M7 has component supply portions T for supplying components to be mounted on substrates. The component supply portions T are provided in opposite side portions of each component mounting device M3 to M7. Component supply devices can be disposed in each component supply portion T. Examples of the component supply devices include tape feeders, tray feeders, stick feeders, etc. In this embodiment, a plurality of tape feeders are arranged in parallel in each component supply portion T. Examples of the component supply portions T include feeder tables fixed to the component mounting devices, carts removably attached to the component mounting devices, etc. When the component supply devices are tray feeders, the component supply portions T themselves are handled as tray feeders that are component supply devices.

As illustrated in FIG. 1A, the component mounting system 1 has a plurality of component shelves 6 (only three shelves are illustrated here, for example) as storage facilities for storing components to be mounted on the component supply portions T. Tape reels that store carrier tapes holding components are stored in the component shelves 6. A component inventory information management portion 5 stores, updates and manages the kind and number of components stored in each component shelf 6 as component inventory information. The component inventory information stored in the component inventory information management portion 5 is transmitted to the management apparatus 2 through the communication network 3 appropriately.

Based on the line information transmitted from the line information management portion 4 in each component mounting line L and the component inventory information transmitted from the component inventory information management portion 5 in each component mounting line L, the management apparatus 2 executes processing to give an instruction to each operator who is executing work in a production area so as to inform the operator of a work sequence with which component supply works will be executed on the component mounting devices M3 to M7 when each component mounting line L is operated.

Figure 2:
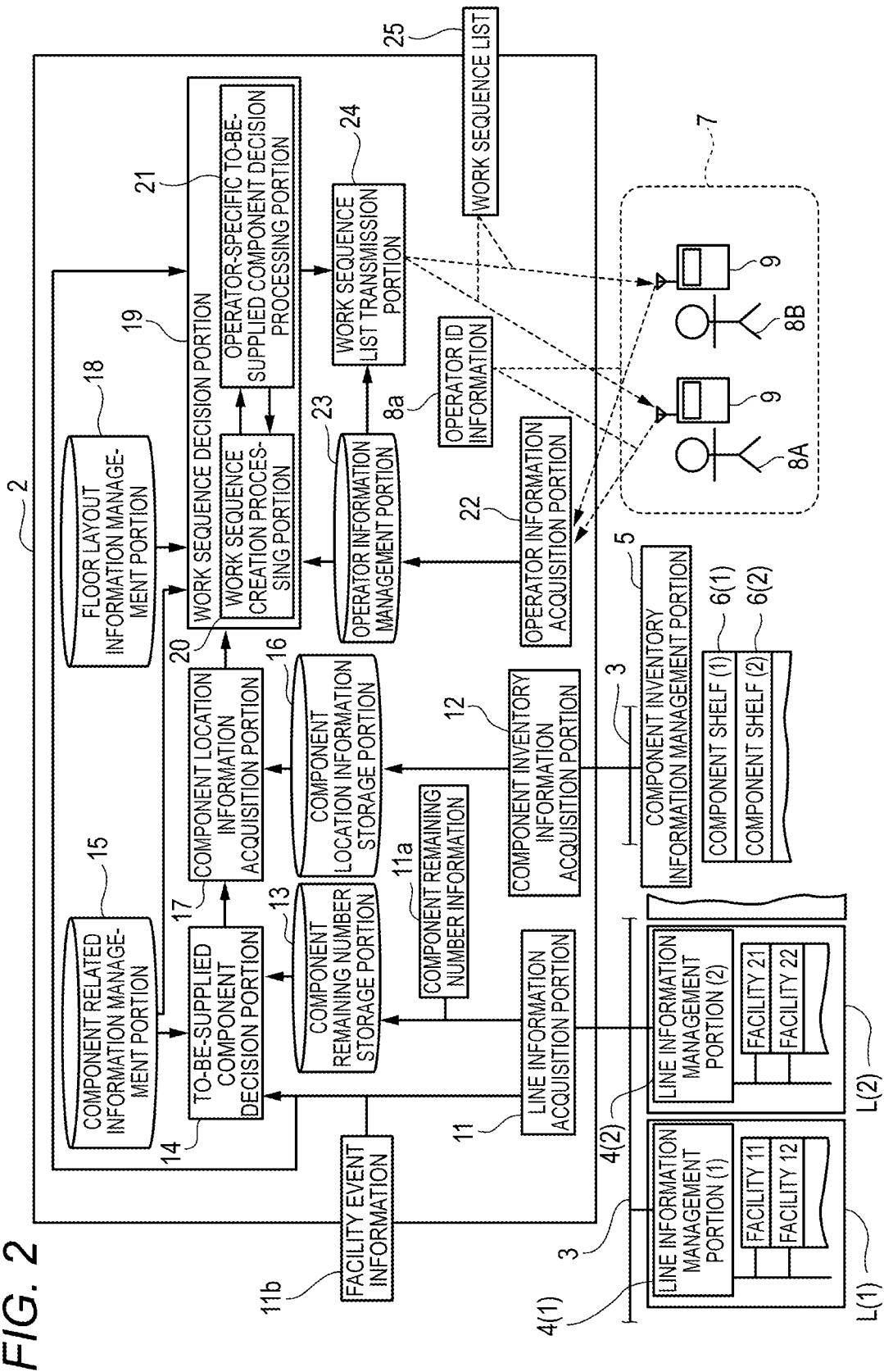
FIG. 2 is a block diagram showing processing functions of the management apparatus according to the embodiment of the invention.

Next, the configuration and processing function of the management apparatus 2 will be described with reference to FIG. 2. In FIG. 2, the management apparatus 2 has a line information acquisition portion 11, a component inventory information acquisition portion 12, a to-be-supplied component decision portion 14, a component location information acquisition portion 17, a work sequence decision portion 19, an operator information acquisition portion 22 and a work sequence list transmission portion 24 as processing function portions. In addition, the management apparatus 2 has a component remaining number storage portion 13, a component related information management portion 15, a component location information storage portion 16, a floor layout information management portion 18 and an operator information management portion 23 as information management/storage portions.

Functions of the respective portions will be described. The line information acquisition portion 11 acquires line information from the line information management portions 4(1), (2) . . . belonging to the component mounting lines L(1), (2), . . . respectively. In addition, the component inventory information acquisition portion 12 acquires component inventory information from the component inventory information management portions 5 setting the component shelves 6(1), (2), . . . as management targets respectively. Operators 8 (8A and 8B) are distributed in a production area 7 including the component mounting lines L and the component shelves 6. Each operator 8 owns a portable terminal 9. The portable terminal 9 has a wireless communication function, with which information can be exchanged with the management apparatus 2. The operator information acquisition portion 22 acquires operator ID information 8a (see FIG. 6) transmitted from the portable terminal 9 owned by the operator 8.

The line information acquisition portion 11 acquires line information transmitted from the line information management portions 4 of the respective component mounting lines L. Examples of the line information include information about the remaining numbers of components stored in the tape feeders (component supply devices) of the component mounting devices M3 to M7 that are facilities belonging to each component mounting line L, facility event information 11b indicating work events such as component supply works executed in those facilities respectively. Incidentally, the facilities 11, 12, . . . illustrated in FIG. 2 correspond to a facility 1, a facility 2, . . . (see FIG. 1B) belonging to the component mounting line L(1). Of the line information, the component remaining number information 11*a* indicating the remaining numbers of components is stored in the component remaining number storage portion 13. That is, the line information acquisition portion 11 and the component remaining number storage portion 13 constitute a component remaining number information acquisition portion for acquiring the remaining numbers of components stored in the component supply devices from the component mounting devices M3 to M7, and storing the acquired remaining numbers of components.

Of the line information acquired by the line information acquisition portion 11, the facility event information 11*b* is transmitted to the to-be-supplied component decision portion 14 and the work sequence decision portion 19. The to-be-supplied component decision portion 14 performs processing for deciding to-be-supplied components, that is, components that should be supplied because the remaining number of the components is reduced in the execution process of component mounting work. In this processing for deciding to-be-supplied components, the remaining number of components in each component mounting device stored in the component remaining number storage portion 13 is monitored for each tape feeder, and components whose remaining number has been smaller than a remaining number threshold 30*a* (see FIG. 3A) defined in advance as default setting is decided as to-be-supplied components. Incidentally, when the system starts up, the remaining number threshold 30*a* is inputted as default setting and stored in the component related information management portion 15.

Figure 3A:
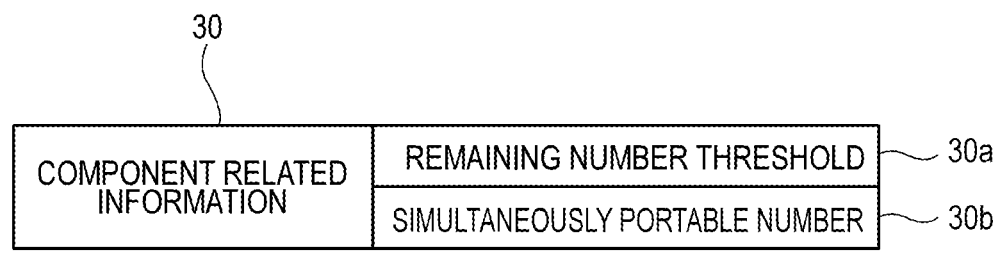
FIGS. 3A and 3B are tables for explaining component related information and operator information in the component mounting system to which the management apparatus according to the embodiment of the invention is applied.

As illustrated in FIG. 3A, the remaining number threshold 30*a* and a simultaneously portable number 30*b* are included in the component related information 30 that is stored in the component related management portion 15. The simultaneously portable number 30*b* is a number of components the operator 8 can carry simultaneously by one-time component supply operation. The simultaneously portable number 30*b* is defined in advance for each kind of components. The simultaneously portable number 30*b* is data that will be referred to in processing for deciding a work sequence in the work sequence decision portion 19, which will be described later. Incidentally, the simultaneously portable number 30*b* may be set for each operator 8 in accordance with the skill of the operator 8 or may be set as a common value to be applied to all the operators 8 equally.

As illustrated in FIG. 2, the component inventory information acquisition portion 12 acquires component inventory information transmitted from the component inventory information management portion 5, that is, information about components stored as inventories in the component shelves 6(1), (2), . . . Examples of the information about components include kinds, numbers and locations of respective components. The location of components means a component shelf and a location within the component shelf in which the components are stored. The acquired information is stored in the component location information storage portion 16 as component location information indicating the position where components to be supplied are located. The component location information acquisition portion 17 refers to the component location information in the component location information storage portion 16 to specify the location information of components decided as to-be-supplied components by the to-be-supplied component decision portion 14, that is, the component shelf 6 where the components are stored. The specified component location information is transmitted to the work sequence decision portion 19.

Figure 3B:
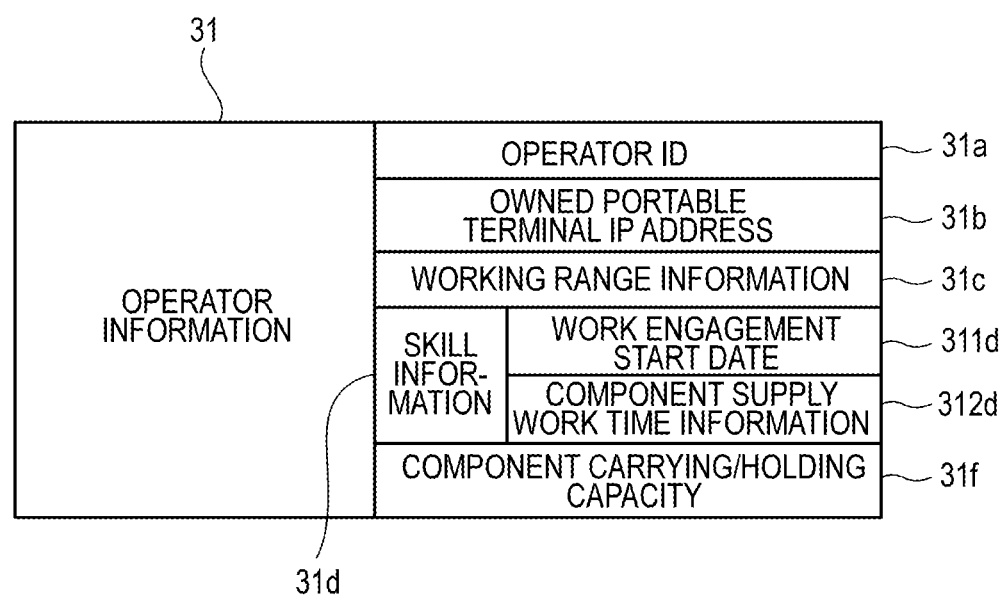

Operator ID information 8*a* transmitted from the operator 8 through the portable terminal 9 is acquired by the operator information acquisition portion 22. The operator ID information 8*a* includes at least an operator ID 31*a*. The operator ID information 8*a* is stored in the operator information management portion 23 as the operator ID 31*a* of operator information 31 illustrated in FIG. 3B. On this occasion, an IP address of the portable terminal owned by the operator 8 corresponding to the operator ID 31*a* (portable terminal IP address 31*b*) is stored in the operator information management portion 23 as the operator information 31 together with the operator ID 31*a*. Which operator 8 is logging in and which portable terminal 9 the operator 8 is logging in can be managed from the operator ID 31*a* and the portable terminal IP address 31*b*. That is, the operator information acquisition portion 22 serves as a log-in state information acquisition portion for acquiring the operator ID information 8*a* as information indicating the log-in state in which each operator 8 is logging in using the portable terminal 9 owned by the operator 8.

The operator information 31 includes working range information 31*c*, skill information 31*d* and component carrying/holding capacity 31*f* as well as the operator ID 31*a* and the portable terminal IP address 31*b*. The working range information 31*c* is information indicating a working range assigned to the operator. The working range can be assigned accordingly. For example, the working range is assigned by component mounting line unit or facility unit. The working range where the operator should work is specified by the working range information 31*c*. That is, the operator information acquisition portion 22 and the operator information management portion 23 serve as worker information storage portions for storing worker information including working ranges of operators in the component mounting lines L.

The skill information 31*d* includes work engagement history information 311*d* and component supply work time information 312*d*. The work engagement history information 311*d* and the component supply work time information 312*d* are information about the technical level with which the operator can execute work. The work engagement history information 311*d* indicates a history of engagement in work. The operator who has a longer history of engagement in work is estimated to have a higher technical level. The work engagement history information is, for example, information about the date on which the operator started the work, information about the number of days for which the operator has engaged in the work, etc. The work engagement history information is defined by at least one of such pieces of information.

The component supply work time information 312*d* is information about the time for the operator to take for component supply work. The component supply work includes at least one of a so-called splicing work in which a tape of a new tape reel is spliced to a tape of a current tape reel attached to a tape feeder serving as a component supply device, a work for setting a new tape reel in a splice-less type tape feeder, and a work for attaching a new tape feeder mounted with to-be-supplied components to an empty feeder address of a component supply portion T of a component mounting device. The operator who is shorter in component supply work time is estimated to have a higher technical level. The component carrying/holding capacity 31*f* indicates the number of components the operator can carry and hold in one-time operation of component supply work, for example, how many tape reels the operator can move with.

The work sequence decision portion 19 generates work sequence information indicating a work sequence of a plurality of component supply works for each operator, based on component remaining number information for a plurality of components acquired within a predetermined period of time by the component remaining number information acquisition portion and stored in the component remaining number storage portion 13, and the operator information 31 (worker information) stored in the operator information management portion 23. On this occasion, the work sequence decision portion 19 decides the work sequence with the work sequence information including the work in which the operator acquires to-be-supplied components from the component shelf 6, based on the component location information transmitted from the component location information acquisition portion 17. Further, the work sequence is decided also referring to the aforementioned facility event information 11b, the aforementioned simultaneously portable number 30b, and the floor layout information 32 stored in the floor layout information management portion 18.

Figure 4A:
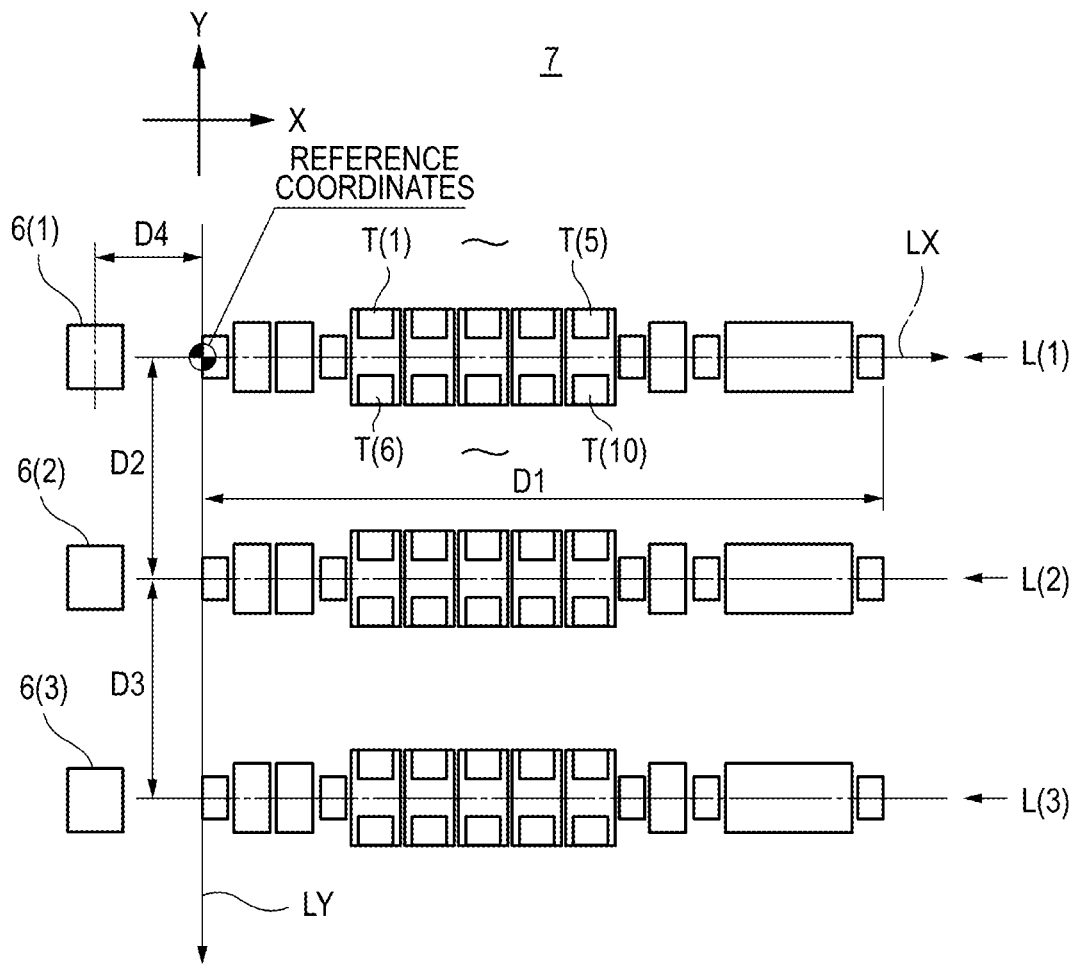
FIGS. 4A and 4B are a view and a table for explaining floor layout information in the component mounting system to which the management apparatus according to the embodiment of the invention is applied.

Here, the floor layout information 32 will be described with reference to FIGS. 4A and 4B. FIG. 4A shows the floor layout in the production area 7 as a target. FIG. 4A shows an example of the production area 7 including three component mounting lines L(1), (2) and (3) and three component shelves 6(1), (2) and (3). In each component mounting device (see the component mounting device M3 to the component mounting device M7 illustrated in FIG. 1B) disposed in each component mounting line L, component supply portions T mounted with tape feeders serving as component supply devices respectively are provided on the opposite sides with respect to the center line of the component mounting device. A number is assigned to each component supply portion T so that the component supply portion T can be identified and its position can be specified. In the example illustrated here, numbers are assigned to the component supply portions T on one side with respect to the center line of the component mounting device as T(1) to T(5) in the order from the upstream side, and to the component supply portions T on the other side as T(6) to T(10) in the order from the upstream side. Incidentally, any method may be used to assign numbers to the component supply portions T and may be set accordingly.

In the aforementioned floor layout, reference coordinates are set at a desired place, and the position of each portion is defined using an XY coordinate system defined with the reference coordinates as its center. In the embodiment, a point of intersection between the device center line of the component mounting line L(1) and the straight line connecting the front end points of the component mounting lines L is set as reference coordinates, while the device center line of the component mounting line L(1) is set as the X axis and the straight line connecting the front end points of the component mounting lines L is set as the Y axis. The position of each component supply portion T or each component shelf 6 in the production area 7 is specified by numerical coordinates in the aforementioned coordinate system. As a result, in the component supply work in which an operator extracts to-be-supplied components from a component shelf 6 and carries the extracted components to a component supply portion T of a component mounting line L to supply the components thereto, a moving distance from a desired component shelf 6 to a desired component supply portion T and further a moving distance between desired two component supply portions T can be obtained by numerical operation.

Figure 4B:
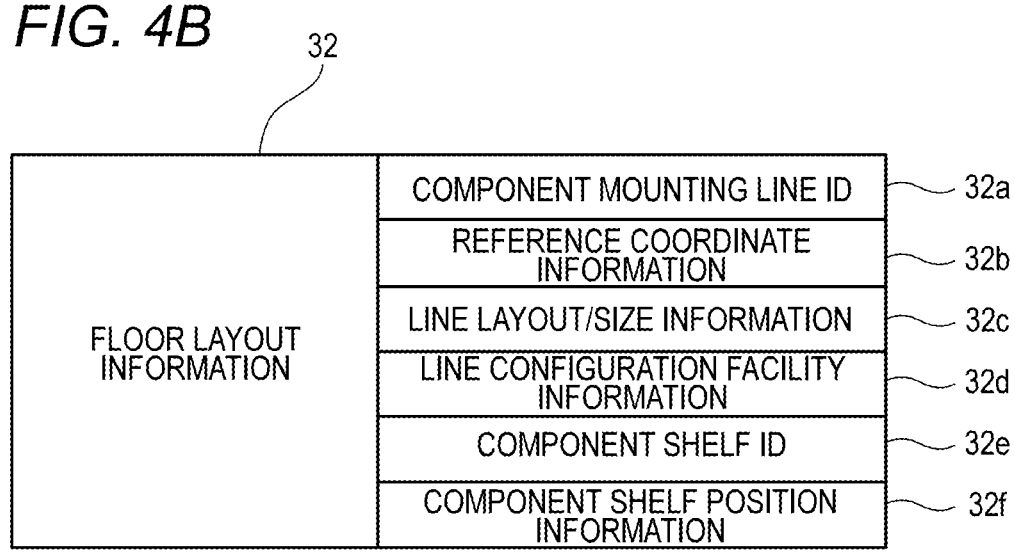

As illustrated in FIG. 4B, the floor layout information 32 includes component mounting line ID 32a, reference coordinate information 32b, line layout/size information 32c, line configuration facility information 32d, component shelf ID 32e, and component shelf position information 32f. The component mounting line ID 32a is an ID code for identifying each component mounting line L(1), (2) or (3). The reference coordinate information 32b is information for specifying coordinates as positional reference in the floor layout.

The line layout/size information 32c includes data indicating the layout of respective portions constituting the component mounting lines L, such as a mounting line length D1, line intervals D2 and D3, a component shelf distance D4, etc. as illustrated in FIG. 4A. The line configuration facility information 32d includes data about the kinds of facilities constituting each component mounting line L, the array of the facilities, the size of each portion, etc. as illustrated in FIG. 1B. Those pieces of data include information about the array of component mounting devices in each component mounting line, information about the position of each component supply portion T to which components should be supplied, etc. The component shelf ID 32e is an ID code for identifying each component shelf 6 individually. The component shelf position information 32f include data for specifying the position of each individual component shelf 6.

In this manner, the management apparatus 2 is further provided with a floor layout storage portion (floor layout information management portion 18) for storing the floor layout information 32 including at least one of kinds, sizes and positions of facilities constituting each component mounting line L. The work sequence decision portion 19 generates work sequence information based on the floor layout information 32.

The work sequence decision portion 19 includes a work sequence creation processing portion 20 and an operator-specific to-be-supplied component decision processing portion 21. The work sequence creation processing portion 20 performs processing to create a plurality of component supply works as targets. The operator-specific to-be-supplied component decision processing portion 21 performs processing to assign the component supply works as targets to the operators individually. Based on a result in which these two processings are taken into consideration, a work sequence of component supply works assigned to each operator is decided. The decision result of the work sequence is outputted from the work sequence decision portion 19 to the work sequence list transmission portion 24 as a work sequence list that is work sequence information for each operator. The work sequence list transmission portion 24 transmits the outputted work sequence list (see FIGS. 7A and 7B) to the portable terminal 9 owned by the corresponding operator. Each operator executes component supply works along the work sequence list received by the operator. That is, the work sequence list transmission portion 24 serves as an information transmission portion for transmitting work sequence information to an operator who should perform works.

In the processing for creating a work sequence in the work sequence creation processing portion 20, work sequence creation processing related information 33 illustrated in FIG. 5 is referred to. The work sequence creation processing related information 33 includes processing start time acquisition information 34, conditions 35 and exception handling 36. The processing start time acquisition information 34 is information serving as a precondition for the work sequence creation processing. The processing start time acquisition information 24 includes log-in state information 22a including operator ID information 8a acquired by the operator information acquisition portion 22 in addition to the component remaining number information 11a and the facility event information 11b acquired by the line information acquisition portion 11.

The conditions 35 are conditions with which the work sequence is created. Here, first to prevent facility stop from occurring due to shortage of components is stipulated as (Condition 1) 35a. That is, the work sequence is decided to prevent occurrence of such an event that to-be-supplied components determined as components to be supplied by the to-be-supplied component decision portion 14 is used up before the component supply work of the components is completed. Therefore, the work sequence is, for example, decided in consideration of the time before shortage of the components estimated in consideration of the consumption rate of the components etc., that is, the component supply work time 31e of the operator information 31. The remaining number threshold 30a referred by the to-be-supplied component decision portion 14 is set to a numeric value which prevents facility stop from occurring due to shortage of the components.

To make the moving distance required for supplying the components as small as possible is stipulated as (Condition 2) 35b. That is, the moving distance is obtained by arithmetic operation based on the information about the position of a component supply portion T to be supplied with the components. The position of the component supply portion T is indicated in the floor layout information illustrated in FIG. 4B. The work sequence is decided to make the obtained moving distance as small as possible. On this occasion, the work sequence may be decided in such a form that a work to bring the components from a component shelf 6 is added to the work sequence. In this case, the information about the position of the component shelf 6, which serves as a component location position, is further taken into consideration. As a method for deriving a result in which the moving distance is as small as possible, for example, of results obtained by arithmetic operation, one in which the moving distance is the smallest may be selected, or one may be selected, in consideration of other conditions, from results in which the moving distance is below a predetermined threshold of the moving distance.

To preferentially supply components shorter in time before the components are used up is stipulated as (Condition 35d). That is, to satisfy the (Condition 1) 35a, component supply is executed to give priority to components whose remaining number is smaller and whose consumption rate is higher.

As for (Condition 4) 35d, when a plurality of operators are assigned within one and the same working range, an operator who should execute the component supply work is decided based on skill information of the operator. Specifically, first, priority is given to an operator whose component supply work time is shorter, with reference to the component supply work time information 312d of the skill information 31d registered in the operator information 31 for the operator. When there is no difference in component supply work time, priority is given to an operator whose work engagement time is longer, with reference to the work engagement history information 311d.

That is, the operator information management portion 23 serving as a worker information storage portion further includes technical level information (skill information) about the technical level of each operator. The work sequence decision portion 19 gives priority to an operator based on the technical level information when a plurality of operators are within one and the same working range.

As for (Condition 5) 35e, when a desired operator in charge of a work has not logged in, the work is assigned to another operator. Incidentally, when all the operators have not logged in, notification is sent to a manager. That is, when an operator to whom a work should be assigned has not logged in, the work sequence decision portion 19 assigns the work to another operator who has logged in, with reference to information from the operator information acquisition portion 22 serving as a log-in state information acquisition portion. On this occasion, another operator to whom the work is assigned may be decided with reference to the operator information 31. For example, an operator whose work engagement history is longer or an operator whose component supply work time is shorter may be selected with reference to the skill information 31d.

The exception handling 36 stipulates exception handling in the aforementioned processing. That is, when an interrupt (such as an event in which the remaining number of components is below a threshold or an event in which the components is used up) occurs after a work sequence is decided and work sequence information is transmitted to an operator, a work sequence is decided again in real time so that the components can be supplied with priority.

That is, when a work high in emergency occurs after the work sequence list transmission portion 24 serving as an information transmission portion transmits the work sequence list 25 as work sequence information to an operator, the work sequence decision portion 19 decides a work sequence again so that the work high in emergency can be performed with priority. The work sequence list transmission portion 24 transmits, to the operator, the work sequence list 25 based on the work sequence decided again. Here, an example of the work high in emergency as a target of exception handling corresponds to a supply work of components whose remaining number is below a remaining number threshold set as a limit or whose remaining number has been zero.

Incidentally, the aforementioned conditions (1) to (5) and the aforementioned exception handling are illustrated exemplarily. All or parts of those may be combined, or combined with other conditions or processings within the scope of the advantage of the embodiment Next, the processing flow of the work sequence instruction system during the operation of the component mounting system 1 will be described with reference to FIG. 6. FIG. 6 illustrates processing in the line information management portion 4 of each component mounting line L, processing to be executed by the management apparatus 2, and processing to be executed through the portable terminal 9 operated by each operator, respectively.

When the system is started up in the management apparatus 2, the following processing is started. First for the all, default setting is executed (ST1). That is, data contents meeting the contents of processing to be executed are set in the remaining number threshold 30a (see FIGS. 3A and 3B) of the component related information 30 stored in the component related information management portion 15, the floor layout information 32 (see FIGS. 4A and 4B) stored in the floor layout information management portion 18 and the operator information 31 stored in the operator information management portion 23.

Next, an operator 8 (the operator 8A or 8B here) distributed in the production area 7 as a target starts up the portable terminal 9 owned by the operator 8 and logs in the system (ST2). As a result, the operator ID information 8a indicating the operator ID 31a of the operator 8 is transmitted to the operator information acquisition portion 22 through the portable terminal 9, and the operator information acquisition portion 22 acquires the operator ID 31a of the operator 8 who has logged in (ST3). Here, when an operator 8 to which the work should be assigned has not logged in, the work sequence decision portion 19 assigns the work to another operator 8 who has logged in. That is, the work sequence decision portion 19 assigns the work to an alternative operator based on information from the operator information acquisition portion 22 serving as a log-in state information acquisition portion.

When production is started in each component mounting line L, the line information management portion 4 collects line information from each facility and updates component remaining number data of components in the facility (ST4). The updated component remaining number information 11a is transmitted to the line information acquisition portion 11 of the management apparatus 2. Thus, the management apparatus 2 acquires the component remaining number information 11a (ST5). The acquired component remaining number data are stored in the component remaining number storage portion 13. The line information acquisition portion 11 acquires component remaining number information 11a in a predetermined cycle (for example, intervals of several minutes).

Next, to-be-supplied components are decided by the to-be-supplied components decision portion 14. That is, it is determined whether there are components whose remaining number is smaller than the remaining number threshold 30a stored in the component related information management portion 15 or not (ST6). Here, when it is determined that there are components whose remaining number is smaller than the remaining number threshold 30a, the components are decided as components to be supplied (ST7). On the other hand, when it is determined in (ST6) that there are no components whose remaining number is smaller than the remaining number threshold 30a, processing returns to (ST5), and processing in and after (ST5) is repeated. That is, processing in and after (ST5) is executed after waiting for the event that the line information acquisition portion 11 acquires the component remaining number information 11a at a predetermined cycle.

When components to be supplied are decided in (ST7), the component location information acquisition portion 17 acquires location information of the components with reference to the component location information stored in the component location information storage portion 16 (ST 8). The component location information acquired by the component location information acquisition portion 17 is transmitted to the work sequence decision portion 19, and a work sequence to be executed by the operator 8A, 8B in order to supply the components is decided by the work sequence decision portion 19 (ST9). A work sequence list is created based on the decided work sequence (ST10). Next, the created work sequence list is transmitted to the operator 8A, 8B by the work sequence list transmission portion 24 (ST11). Thus, the work sequence list 25 is transmitted to the portable terminal 9 owned by the operator 8A, 8B, and the work sequence list 25 is displayed on a display screen of the portable terminal 9. The operator 8A, 8B executers a supply work of the components in accordance with the displayed work sequence list 25.

In the component mounting line L in which such a component supply work is executed, the line information management portion 4 monitors and determines whether a component supply completion event has been received from each facility or not (ST13). When having received the component supply completion event, the line information management portion 4 transmits the facility event information 11b to the management apparatus 2 (ST14). In the management apparatus 2, the line information acquisition portion 11 monitors whether the facility event information 11b has been received or not (ST15). When the line information acquisition portion 11 has received the component supply completion event, the management apparatus 2 performs processing for updating the work sequence list (ST16). As a result, the components for which component supply has been completed is deleted from the work sequence list 25. Returning to (ST11), similar processing is repeated. On the other hand, when it is not confirmed in (ST15) that the component supply completion event has been received, processing returns to (ST5). Similar processing in and after (ST5) is executed repeatedly. That is, processing in and after (ST5) is executed after waiting for the event that the line information acquisition portion acquires the component remaining number information 11a in a predetermined cycle.

That is, the management apparatus 2 is further provided with a work completion information acquisition portion (line information acquisition portion 11) for receiving a component supply completion event serving as work completion information from each component mounting device constituting each component mounting line L. The work sequence decision portion 19 updates the work sequence list 25 serving as work sequence information based on the received component supply completion event, and transmits the updated work sequence list 25 to each operator.

FIGS. 7A and 7B illustrate examples of the work sequence list 25 transmitted to each operator from the work sequence list transmission portion 24. FIGS. 7A and 7B illustrate work sequence lists 25 transmitted to the two operators 8A and 8B who are working in the production area 7 illustrated in FIG. 8, respectively.

Each work sequence list 25 includes an "operator field" 37 for specifying an operator who should take charge of a component supply work. Due to the "operator field" 37, an operator name and an operator ID can be specified. The work sequence list 25 includes an "work No." 38a, a "target line" 38b, a "table" 38c, an "address" 38d, a "component name" 38e, and a "location position" 38f.

The "work No." 38a is a number given to each work. Here, the "work No." 38a corresponds to the order with which the operator should perform the work. The "target line" 38b shows a component mounting line L where the work should be performed. The "table" 38c shows a component supply portion T to which the components should be supplied in the component mounting line L. The "address" 38d shows a feeder address A where the component supply work should be performed in the component supply portion T. The "component name" 38e shows a component name of the components to be supplied. The "location position" 38f shows a component shelf where the components are stored.

Incidentally, the work sequence list 25 does not list orders of works as in the embodiment, but may indicate a route of the component supply work itself visually. As a specific example, it can be considered that an image view of a floor and a moving route indicated by arrows as illustrated in FIG. 8 that will be described later are displayed on a portable terminal owned by an operator.

Figure 8:
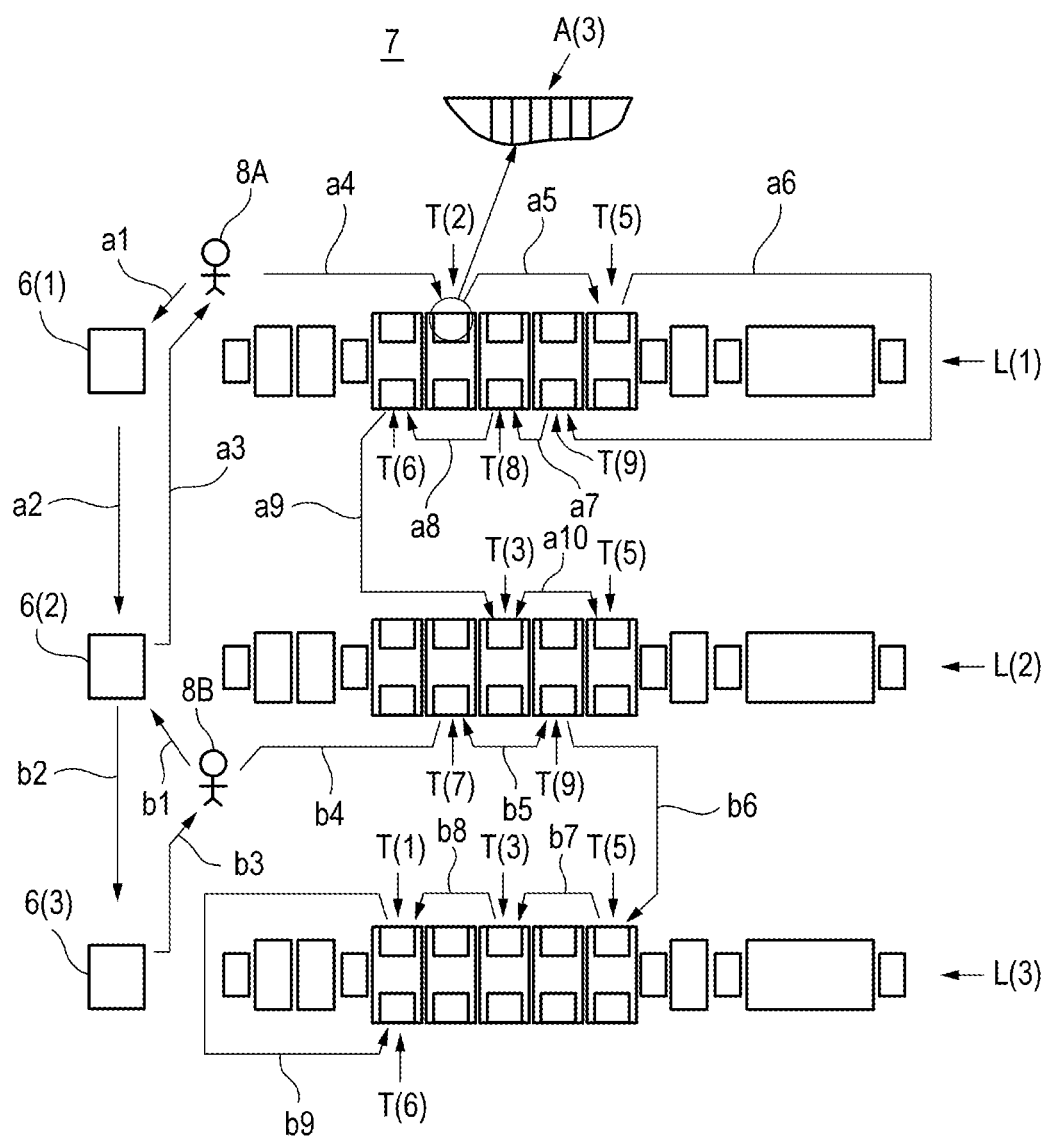
FIG. 8 is a view for explaining a working image of the component supply works in the component mounting system according to the embodiment of the invention is applied.

FIG. 8 shows an image in which each operator executes component supply work in accordance with instructions in the work sequence list 25 illustrated in FIGS. 7A and 7B. Here, the three component mounting lines L(1), (2) and (3) are disposed in the production area 7 in accordance with the floor layout illustrated in FIG. 4A. Two operators 8A and 8B have been assigned to the component mounting lines L. Incidentally, in FIGS. 7A and 7B, only the range where the "work No." 38a is 1 to 4 is depicted, but the range where the "work No." 38a is higher than 4 is not illustrated.

First, the component supply work to be executed by the operator 8A will be described based on the work sequence list 25 illustrated in FIG. 7A. The book shelves 6(1) and (2) are written in the "location positions" 38f in FIG. 7A. Therefore, as illustrated in FIG. 8, the operator 8A first moves to the component shelf 6(1) (arrow a1), and extracts components whose component names are Paaa and Pbbb indicated by the "component names" 38e here. Next the operator 8A moves to the component shelf 6(2) (arrow a2), and extracts components whose component names are Pccc and Pddd indicated by the "component names" 38e here.

The operator 8A holding those components moves to the component mounting line L(1) where work should be performed (arrow a3). In accordance with the sequence indicated by each "work No." 38a, the operator 8A executes component supply work on the component supply portion T indicated by each "table" 38c sequentially. Incidentally, the contents of an instruction indicated by each "component name" 38e includes the number of reels to be referred to when the operator 8A extracts, from the component shelf 6(1), (2), tape reels storing the components to be supplied. This information about the number of reels is based on the simultaneously portable number 30b stipulated in the component related information 30 and the component carrying/holding capacity 31f stipulated in the operator information 31. Thus, the number of components the operator can carry and hold simultaneously can be reasonably instructed in accordance with the capacity of the operator, so that the working efficiency can be improved.

The operator who has thus extracted the components to be supplied moves to the component supply portion T(2) first (arrow a4). Here, on the feeder address A (A(3) in the example illustrated here) indicated by the "address" 38d, the operator executes component supply work of the components (component name Paaa) indicated by the "component name" 38e. Here, as the component supply work, a tape of the components Paaa is spliced to a preceding tape that has been attached to a tape feeder serving as a component supply device mounted in the feeder address A(3). After that, in accordance with the sequence indicated by each "work No." 38a, the operator 8A executes component supply work on the component supply portion T indicated by each "table" 38c sequentially in the same manner.

That is, the operator 8A moves to the component supply portion T(5) (arrow a5), and next moves to the component supply portions T(9), T(8) and T(6) on the opposite side of the component mounting line L(1) sequentially (arrows a6, a7 and a8). In each component supply portion T, the operator 8A executes component supply work of components indicated by each "component name" 38e on the feeder address A indicated by each "address" 38d. After that, though not illustrated in the work sequence list 25 illustrated in FIG. 7A, the operator 8A moves to the component supply portion T(3) and the component supply portion T(5) in the adjacent component mounting line L(2) (arrows a9 and a10), and performs component supply work on each component supply portion T in the same manner.

Next, the component supply work to be executed by the operator 8B will be described based on the work sequence list 25 illustrated in FIG. 7B. The component shelves 6(2) and (3) are written in the "location positions" 38f in FIG. 7B. Therefore, as illustrated in FIG. 8, the operator 8B first moves to the component shelf 6(2) (arrow b1), and extracts here the components of the component names Pccc and Pddd indicated by the "component names" 38e. Next the operator 8B moves to the component shelf 6(3) (arrow b2), and extracts here the components of the component names Peee and Pfff indicated by the "component names" 38e. The operator 8B holding those components moves to the component mounting line L(2) where work should be performed (arrow b3). In accordance with the sequence indicated by each "work No." 38a, the operator 8B executes component supply work on the component supply portion T indicated by each "table" 38c sequentially.

That is, the operator 8B first moves to the component supply portion T(7) (arrow b4). Here, on the feeder address A(8) indicated by the "address" 38d, the operator 8B executes component supply work of the components indicated by the "component name" 38e. Here, after that, in accordance with the sequence indicated by each "work No." 38a, the operator 8B executes component supply work on the component supply portion T indicated by each "table" 38c sequentially in the same manner.

That is, the operator 8B moves to the component supply portion T(9) (arrow b5), and next moves to the component supply portions T(5) and T(3) in the component mounting line L(3) sequentially (arrows b6 and b7). In each component supply portion T, the operator 8B executes component supply work of components indicated by each "component name" 38e on the feeder address A indicated by each "address" 38d. After that, though not illustrated in the work sequence list 25 illustrated in FIG. 7B, the operator 8B moves to the component supply portion T(1) and the component supply portion T(6) on the opposite side of the component mounting line L(3) sequentially (arrows b8 and b9), and performs component supply work on each component supply portion T in the same manner.

As has been described above, the management apparatus 2 illustrated in the embodiment has a line information acquisition portion 11, an operator information management portion 23, a work sequence decision portion 19 and a work sequence list transmission portion 24 in order to manage works for supplying components to a plurality of component mounting devices (component mounting devices M3 to M7 here) in each component mounting line L in which the component mounting devices are connected. The line information acquisition portion 11 serves as a component remaining number information acquisition portion by which the remaining number of components stored in each component supply device can be acquired from the component supply device. The operator information management portion 23 serves as a worker information storage portion for storing worker information including a working range of each worker in each component mounting line L. The work sequence decision portion 19 generates a work sequence list 25 as work sequence information indicating a work sequence of a plurality of component supply works for each operator, based on the worker information and component remaining number information about a plurality of components acquired by the line information acquisition portion 11 within a predetermined period of time. The work sequence list transmission portion 24 serves as an information transmission portion for transmitting the work sequence list 25 to the operator who should performs the works.

In this manner, notification about shortage of components for each component mounting line L can be performed timely, so that it is possible to suppress deterioration in operating rate due to facility stop caused by the shortage of components. In addition, for a plurality of component mounting lines L, operators can be distributed reasonably. Accordingly, the number of workers distributed in a production floor can be reduced to improve the productivity.

Incidentally, configurations, functional portions, processing contents, etc. in the embodiment described above are illustrated exemplarily. Those can be modified or combined suitably within the scope where the advantage of the invention can be exerted.

A management apparatus and a management method according to the invention can suppress deterioration in operating rate due to facility stop caused by shortage of components. Therefore, the management apparatus and the management method are useful in a component mounting field in which electronic components are mounted on substrates.

What is claimed is:

1. A component mounting system including a plurality of component mounting devices in the component mounting line in which the component mounting devices are connected to one another, and a management apparatus that manages works to supply components to the plurality of component mounting devices, the component mounting system comprising:
    a to-be-supplied component decision portion that performs processing for deciding components that should be supplied based on component remaining number information acquired from monitoring a remaining number of components in each component mounting device and determining whether the component remaining number is smaller than a remaining number threshold;
    a worker information storage portion that stores worker information including a working range of each of workers in the component mounting line;
    a work sequence decision portion that generates work sequence information indicating a work sequence of a plurality of component supply works for each of the workers based on the worker information, and component remaining number information about a plurality of components acquired by the component remaining number information acquisition portion within a predetermined period of time; and
    an information transmission portion that transmits the work sequence information to the workers who should perform the works such that the workers execute a supply work of the components in accordance with the work sequence information;
    a display screen that receives the work sequence information;
    wherein the display screen displays work sequence information include that a target line that shows the component mounting line where the works should be performed and a table that shows a component supply portion to which the components should be supplied in the component mounting line.

2. The component mounting system according to claim 1, further comprising:
    a component location information storage portion that stores location information indicating locations of to-be-supplied components to be supplied to the component supply devices, wherein the location information includes specifying a component shelf where the to-be-supplied components are located;
    wherein the work sequence decision portion decides the work sequence with the work sequence information including a work in which the workers acquire the to-be-supplied components based on the location information.

3. The component mounting system according to claim 1, further comprising:
    a work completion information acquisition portion that receives work completion information from the component mounting devices,
    wherein the work sequence decision portion updates the work sequence information based on the work completion information, and transmits the updated work sequence information to the workers.

4. The component mounting system according to claim 1, further comprising:
    a floor layout storage portion that stores floor layout information including at least one of a kind, a size and a position of each facility constituting the component mounting line;
    wherein the work sequence decision portion decides the work sequence information based on the floor layout information.

5. The component mounting system according to claim 1, further comprising:
    a log-in state information acquisition portion that acquires information indicating a log-in state of each of portable terminals owned by the worker;
    wherein when the portable terminal owned by the worker to be assigned a work is not in the log-in state, the work sequence decision portion assigns the work to another worker whose portable terminal is in the log-in state based on the information from the log-in state information acquisition portion.

6. The component mounting system according to claim 1, wherein when a work high in emergency occurs after the information transmission portion transmits the work sequence information to the workers, the work sequence decision portion decides work sequence information again so that the work high in emergency is performed with priority, and the information transmission portion transmits the work sequence information decided again to the workers, wherein the work high in emergency is a work for supplying components whose remaining number becomes below a remaining number threshold set as a limit or whose remaining number becomes zero.

7. A component mounting method for mounting electronic components on substrates by using an electronic component mounting system including a plurality of component mounting devices in the component mounting line in which the component mounting devices are connected to one another, and managing works to supply components to the plurality of component mounting devices by a management apparatus that manages the component mounting line, the component mounting method comprising:
    acquiring, from each of the component mounting devices, a remaining number of components stored in the component mounting;
    generating work sequence information indicating a work sequence of a plurality of component supply works for each of the workers by assigning priority to the workers according to conditions based on worker information including a working range of each of the workers in the component mounting line, and component remaining number information about a plurality of components acquired within a predetermined period of time;

transmitting the work sequence information to the workers who should perform the works such that the workers execute a supply work of the components in accordance with the work sequence information;

displaying the work sequence information on a display screen;

wherein the display screen displays work sequence information include that a target line that shows the component mounting line where the works should be performed and a table that shows a component supply portion to which the components should be supplied in the component mounting line.

8. The component mounting method according to claim 7, further comprising:

deciding the work sequence with the work sequence information including a work in which the workers acquire the to-be-supplied components based on location information indicating locations of to-be-supplied components to be supplied to the component supply devices.

9. The component mounting method according to claim 7, further comprising:

receiving work completion information from the component mounting devices, wherein in the deciding process, the work sequence information is updated based on the work completion information, and the updated work sequence information is transmitted to the workers.

10. The component mounting method according to claim 7, wherein in the deciding process, the work sequence information is decided based on floor layout information including at least one of a kind, a size and a position of each facility constituting the component mounting line.

11. The component mounting method according to claim 7, further comprising:

acquiring information indicating a log-in state of each of portable terminals owned by the worker, wherein in the deciding process, when the portable terminal owned by the worker to be assigned a work is not in the log-in state, the work is assigned to another worker whose portable terminal is in the log-in state based on the information from the log-in state information acquisition portion.

12. The component mounting method according to claim 7, wherein in the deciding process, when a work high in emergency occurs after the information transmission portion transmits the work sequence information to the workers, the work sequence decision portion decides work sequence information again so that the work high in emergency is performed with priority, and the information transmission portion transmits the work sequence information decided again to the workers, wherein the work high in emergency is a work for supplying components whose remaining number becomes below a remaining number threshold set as a limit or whose remaining number becomes zero.

* * * * *